SELECTION CIRCUIT

Filed June 3, 1959 5 Sheets-Sheet 1

INVENTOR
E. E. SCHWENZFEGER
BY John E. Cassidy
ATTORNEY

Jan. 30, 1962 E. E. SCHWENZFEGER 3,019,293

SELECTION CIRCUIT

Filed June 3, 1959 5 Sheets-Sheet 2

INVENTOR
E. E. SCHWENZFEGER
BY John E. Cassidy
ATTORNEY

INVENTOR
E. E. SCHWENZFEGER
BY
John E. Cassidy
ATTORNEY

Jan. 30, 1962 E. E. SCHWENZFEGER 3,019,293

SELECTION CIRCUIT

Filed June 3, 1959 5 Sheets-Sheet 4

INVENTOR
E. E. SCHWENZFEGER
BY John E. Cassidy
ATTORNEY

INVENTOR
E. E. SCHWENZFEGER
BY
John E. Cassidy
ATTORNEY

United States Patent Office
3,019,293
Patented Jan. 30, 1962

3,019,293
SELECTION CIRCUIT

Edward E. Schwenzfeger, Bayside, N.Y., assignor to Bell Telephone Laboratories, Incorporated, New York, N.Y., a corporation of New York Filed June 3, 1959, Ser. No. 817,820
7 Claims. (Cl. 178—26)

This invention relates to communication systems and more particularly to the detection and translation of permutation code combinations indicative of either the point of origin or the point of destination of subsequent messages.

The composition of a typical message used in telegraph transmission is as follows: A plurality of routing characters; a plurality of control characters, such as "carriage return" and "line feed"; the message proper; and a distinct end-of-message signal. Each of the above portions is generally separated by a "letters" character.

The most commonly encountered telegraph systems utilize the routing characters for signals identifying the called station, which signals control establishment of connecting paths from the point of origin to the called station. Telegraph systems incorporating "preference" and "multiple-address" features occasionally use these routing characters to also indicate the type of message or the type of address to follow. Still other telegraph systems use the routing characters to designate the originating point of a message rather than the destination point. This latter usage is commonly found in weather report distribution systems, wherein receivers monitor all routing characters and enable recording equipment only upon detection of preselected character combinations. In this way, it is possible to record weather information from only those areas that are of interest to the monitoring party.

There is an increasing volume of information being processed in each of the above-considered systems, and in order to handle the increased volume, it is necessary to either add equipment or improve existing equipment to handle more information within the same periods of time. The present selecting apparatus used to decode routing information is, for the most part, of a mechanical or electromechanical nature. This introduces the undesirable features of too prevalent mechanical failure, too long an operate time, too great a space requirement, and to little flexibility.

An object of the present invention is to provide a selector for decoding a plurality of routing characters preceding messages.

Another object is to provide a unit for translating pluralities of permutation code combinations into a distinct output for each plurality received.

Another object is to provide a selecting means for decoding such permutation code combinations at a rate of approximately 1,000 words per minute.

Still another object is to provide an economical selector which is relatively trouble-free, and which requires a minimum of space.

Experience with solid-state devices has shown that for stability and long life, such components are both reliable and economical. Furthermore, the use of such devices is facilitated by their low heat dissipation and the fact that they may be mounted in any position. With the exception of a small number of gas diodes used in the translator and several control electron tubes, this invention uses solid-state components comprising transistors, semiconducting diodes, and ferroelectric capacitors exclusively.

Another features of the invention lies in the utilization of ferroelectric logic circuits in a manner which affords ease in changing the particular selections to be made by the selecting equipment.

From another aspect, the present invention might be considered an electronic sequentially operated teletypewriter universal selector (SOTUS). As is known, such units are employed in many modern teletypewriter systems.

Basically, the invention comprises a unique combination of circuit elements for providing distinct outputs whenever preselected combinations of characters are applied to the input. In the embodiment chosen to illustrate the invention, mark and space impulses indicative of the elements of a character are fed into a shift register. Upon receipt of a full character, in this case five elements preceded and succeeded by a start and stop element, respectively, the shift register reads out into a code conversion circuit. In the code conversion circuit, the character is analyzed and a single lead representative of the received character, is marked. Subsequent characters are similarly processed. Upon receipt of a predetermined number of such characters, they are decoded, and in accordance with the nature and the sequence of reception thereof, unique outputs are selected.

The foregoing, as well as additional objects and features will be more clearly understood and appreciated from the following description made in conjunction with the drawings wherein.

To form a complete circuit, FIGS. 3 through 6 are arranged side-by-side with figure numbers ascending toward the right.

A weather report distribution system, such as that contemplated, provides a continuous transmission of weather information from each transmitting point in a predetermined sequence, each transmitting station preceding its information by its own address characters. Receivers constantly monitor the transmitted information and record, or otherwise utilize, weather information from only those transmitters furnishing pertinent data.

Figure 1:
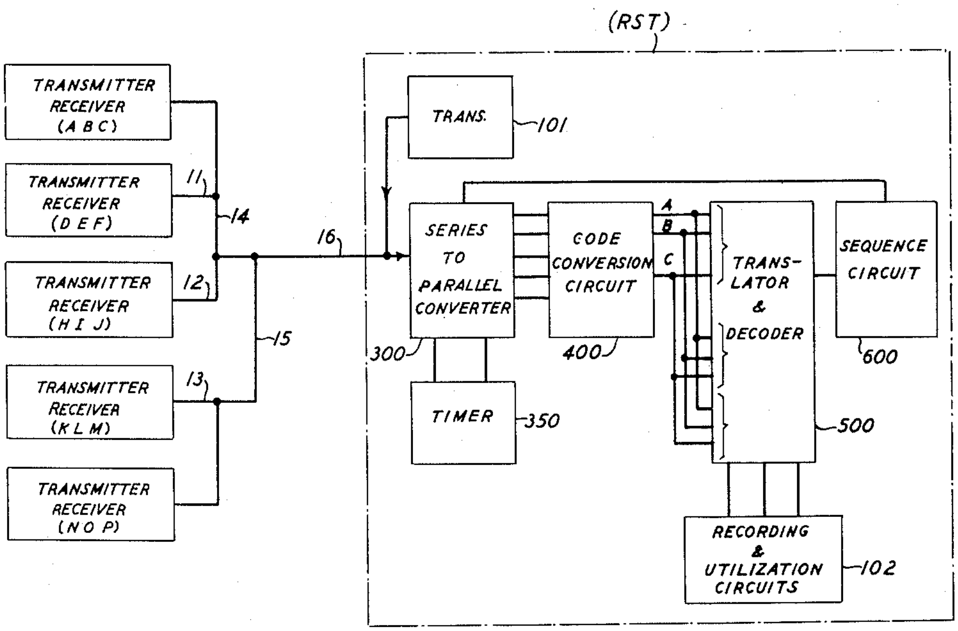
FIG. 1 is a block diagram of an embodiment of the present invention as used in conjunction with a weather report distribution system.

Considering first FIG. 1, wherein the invention is illustrated as being incorporated within a weather report distribution system, it will be seen that a plurality of transmitting and receiving stations may all be interconnected. These interconnections, although indicated by lines 11, 12, 13, 14, 15 and 16, may, with equal effect, consist of radio transmission channels. The factor of primary importance is that each station has a designation. For purposes of discussion, this designation comprises three alphabetic characters, each character being composed of a standard two-condition permutation code combination having five elements. Obviously, with such a code, a maximum of 32 discrete characters is possible. In transmission, the five information-containing elements are preceded and succeeded by start and stop pulses, respectively. It should be understood that in actual operation there may be more receiving stations than transmitting stations and that although in some localities both receiver and transmitter may be located in the same geographic position, this is not necessary. There is no limitation upon the size of such a system, it being within the scope of the invention to blanket entire continents, or for that matter, the entire world, with an integrated system.

As shown in the block diagram Station RST, typical of those contemplated, comprises Transmitter 101, Series-to-Parallel Converter 300, Timer 350, Code Conversion Circuit 400, Translator and Decoder 500, Recording and Utilization Circuits 102, and Sequence Circuit 600. The subsequent circuit schematics are organized in accordance with the hundreds digit of their respective block representation. Thus, Series-to-Parallel Converter 300 appears in FIG. 3, Timer 350 appears in FIG. 3, Code Conversion Circuit 400 appears in FIG. 4, etc.

The elements of incoming characters are sequentially applied to Shift Register 300. Upon receipt of a full character, the elements thereof are simultaneously supplied over a plurality of leads to Code Conversion Circuit 400. In Code Conversion Circuit 400, the elements are interpreted and a single lead representative of the character defined thereby is energized. Translator and Decoder 500 receives and stores the information imparted by this energized lead, and under the control of Sequence Circuit 600 prepares to receive additional information concerning subsequently received characters. It should be noted that Sequence Circuit 600 is directly controlled by Shift Register 300. When a predetermined number of characters have been processed as above (in the illustrative case this is three characters), Translator and Decoder 500 provides a distinct output indicative of the combination of characters received. Sequence Circuit 600 thereupon resets Translator and Decoder 500 and prepares it for later received signals.

Figure 3:
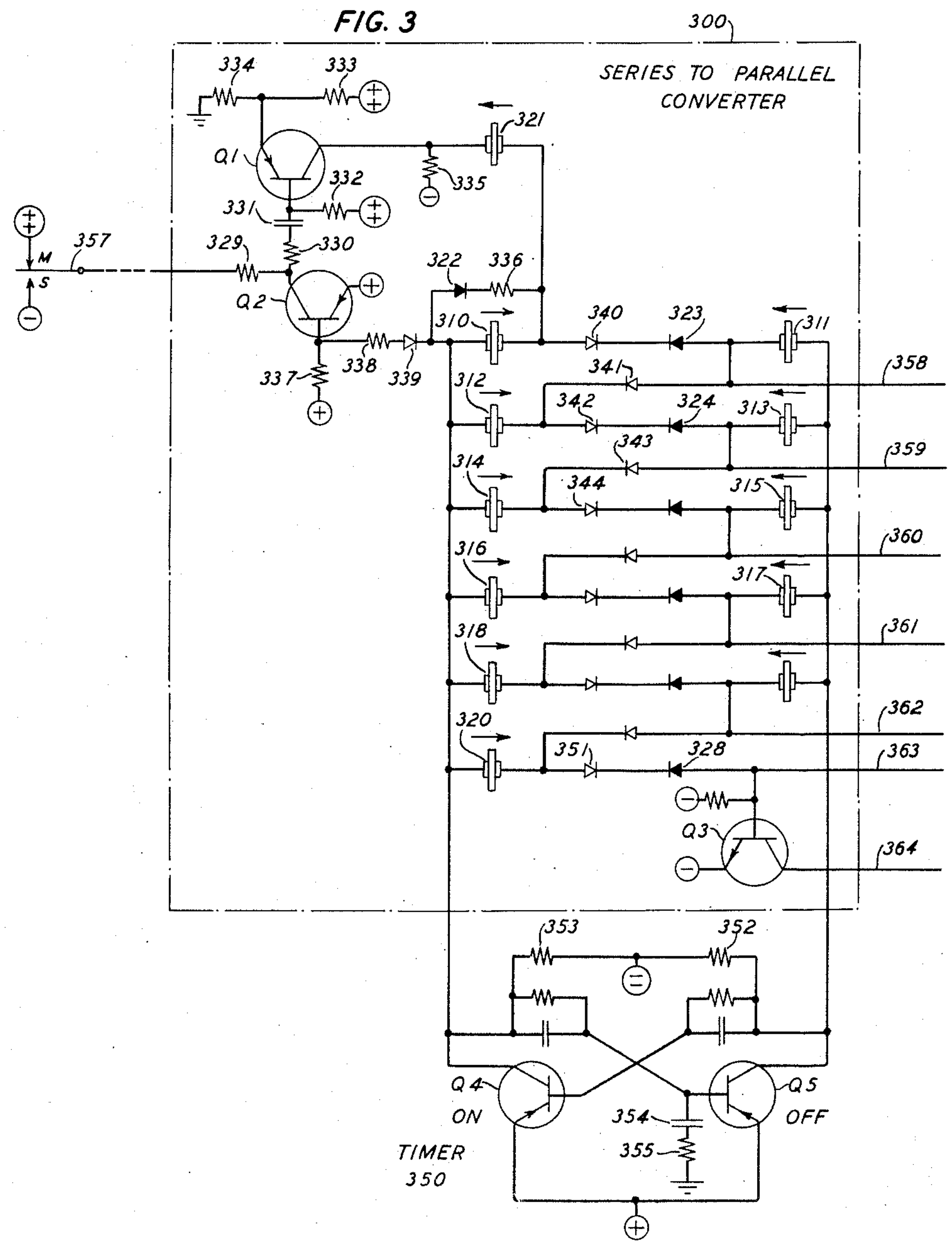
FIG. 3 is a circuit schematic of the shift register and timer circuits employed in the illustrative embodiment.

Before proceeding further, several of the elements and components used in the various subcombinations of the illustrative embodiment will be considered. Extensive use is made of ferroelectric capacitors and two distinct symbols are used to illustrate these in the figures. In FIG. 3, for example, a shift register is disclosed containing a plurality of such capacitors 310 through 320. As is well known, such capacitors exhibit a switching polarization which is analogous to that experienced with magnetic materials exhibiting hysteresis loops. Assuming an initial state of polarization, this state may be reversed by the application of a properly polarized potential having a magnitude designated as the "switching potential." In accordance with convention employed, the initial polarization of the ferroelectric capacitors is designated by a small arrow, so oriented that the capacitor may be switched either by the application of a positive potential to the head of the arrow or by the application of a negative potential to the tail thereof.

FIG. 3 also contains a plurality of saturation or avalanche diodes 322 through 328. These diodes exhibit a negative saturation characteristic such that a reverse voltage below a predetermined magnitude produces very little current. Beyond that magnitude, however, a slight increment of increased reverse voltage will produce a large increment of reverse current. In other words, the avalanche diodes provide a low impedance path for forward current and a low impedance path for reverse current when the reverse voltage is above a predetermined magnitude.

Figure 4:
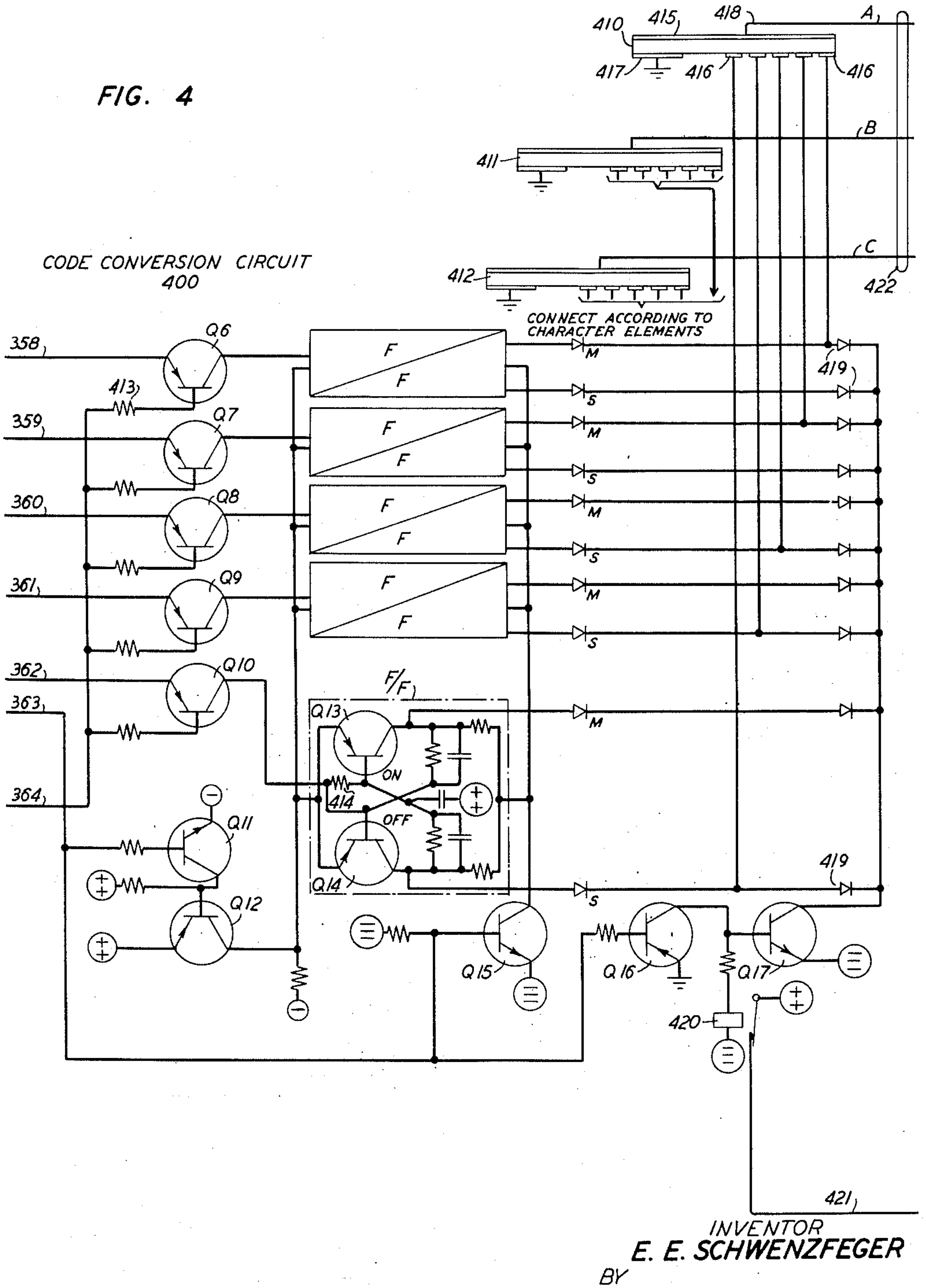
FIG. 4 is a circuit schematic of the code conversion circuit employed in the illustrative embodiment.
Figure 5:
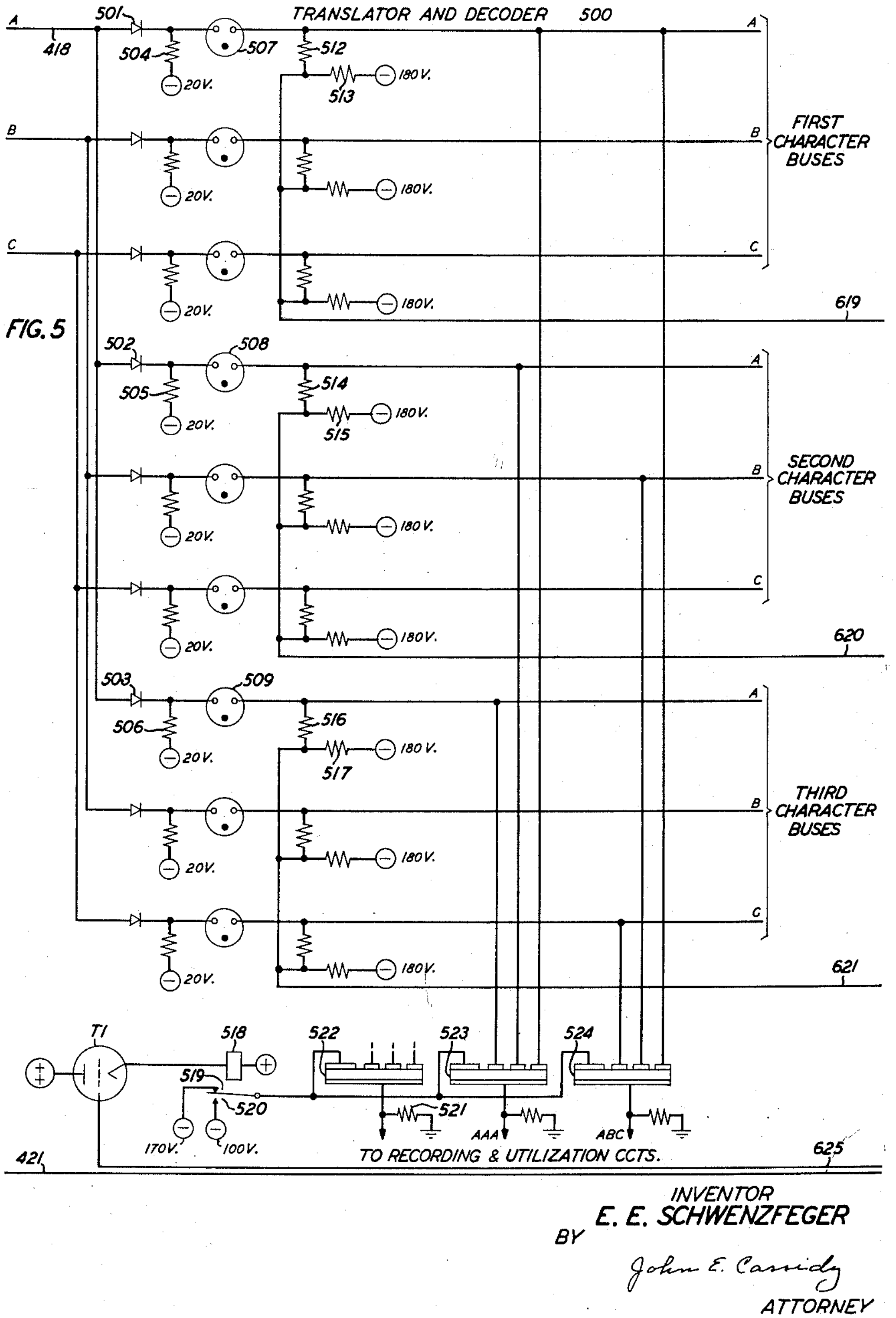
FIG. 5 is a circuit schematic of the translator and decoder of the illustrative embodiment.

FIGS. 4 and 5 disclose a different symbolism for ferroelectric capacitors. This symbolism is deemed to provide a clear and distinct understanding of the circuitry in a minimum of space. The ferroelectric logic circuits in these figures, 410 through 412, and 522 through 524, are illustrated as a single slab of ferroelectric material having conducting plates on both surfaces thereof. Such logic circuits are described in patent application Serial No. 646,998, filed by applicant on March 19, 1957, now United States Patent 2,956,265, issued Oct. 11, 1960.

Throughout the following description, and upon each of the drawings to be considered, the potentials are designated generally by + and − signs in varying numbers. This notation is easily understood. The number of symbols is indicative of the relative magnitude of voltage applied. Thus, for example, ++ is a larger positive voltage than +, and +++ is a larger positive voltage than ++. Similarly, −− and −−− are indicative of a greater negative voltage than − or −−, respectively. There is no intention of conveying the impression that the numbe rof + or − signs is indicative of the ratio of magnitudes with respect to one another. The order of magnitude is not represented, only the relative magnitude.

The details of FIG. 3 disclose a shift register similar to that disclosed in Patent No. 2,876,435, issued March 3, 1959 to J. R. Anderson. As disclosed in that patent, a pulse may be used to "set" the capacitors of one of the stages, and by periodically varying the potentials applied to either side of the register, that "set" condition may be caused to step from stage to stage until, ultimately, it is ejected from the last stage. As will be seen from the following discussion, the alternation of potential from side to side of the shift register of FIG. 3 is accomplished in this invention with a timing monostable multivibrator.

As indicated, the timer multivibrator comprises normally conducting transistor Q4 and normally nonconducting transistor Q5. An RC circuit consisting of capacitor 354 and resistor 355 is used to insure a return to this initial state within a predetermined time whenever the circuit has been triggered to the second state. The potential of the collector of each transistor, when conducting, will reside at approximately +, whereas when nonconducting, they will reside at approximately −−. Consequently, the opposite sides of the shift register are subjected to these potentials, depending upon the state of the timer.

Figure 2:
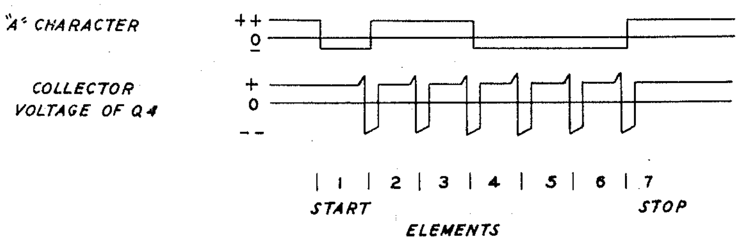
FIG. 2 shows the wave form of the voltage at a particular point in the circuitry with respect to the time of occurrence of the elements of an incoming character.

The operation of the circuitry of FIGS. 3, 4, 5, and 6 will now be described in detail. It will be first assumed that the signal elements defining character "A" are supplied by switch 357 to Series-to-Parallel Converter 300. Of course, switch 357 is merely representative of any means of supplying mark and space pulses. Circuitry preceding this point for receiving, and for demodulating and reshaping the received impulses, when required, is not illustrated herein. The wave form of character "A" is depicted in FIG. 2 and will be seen to comprise seven elements as follows: space-mark-mark-space-space-space-mark. The first and last elements are invariable, and in accord with conventional terminology are called the "start" and "stop" pulse. A mark condition, the initial state, is evidenced by a ++ voltage and a space condition is evidenced by a − voltage.

Application of the start pulse charges capacitor 331 through resistors 329 and 330 to a − level. This initiates conduction of normally nonconducting transistor Q1. Upon conduction the collector of transistor Q1 attains a voltage approximately equal to that appearing at its emitter. Resistors 333 and 334 are so chosen that the emitter is at a value of approximately ++ and consequently this ++ appears upon the collector electrode. There is now a path from ++ through transistor Q1 and ferroelectric capacitors 321 and 310 to the left-hand side of the shift register. As previously discussed, the left-hand side of the register at this time is at +. Because ++ is chosen to be of the order of a "switching potential" above +, and because of the polarization of capacitors 321 and 310, these capacitors are switched. A path also exists from ++ through resistor 333, transistor Q1, ferroelectric capacitor 321, diode 340, avalanche diode 323, ferroelectric capacitor 311, and resistor 352 to −−. This second circuit path is ineffective to cause the switching of ferroelectric capacitor 311 due to the large impedance present in the form of resistors 333 and 352. It is nevertheless true that the magnitude of voltage between ++ and −− is sufficient to break down avalanche diode 323. At this point, therefore, capacitors 321 and 310 are polarized to the right and left, respectively. Leftward polarization of the left-hand capacitors is always indicative of the storage of a space condition in the particular stage concerned.

Upon completion of the switching of capacitor 321, it effectively becomes an open circuit. Consequently, ++ is no longer transmitted through capacitor 321 to capacitor 310. The difference in voltage magnitude between + and —— being both above the order of a "switching potential" and also above the breakdown potential of avalanche diode 323, the + on the collector of transistor Q4 now acts through capacitor 310, diode 340, avalanche diode 323, capacitor 311, and resistor 352 to the —— supplying the collector of transistor Q5. Again, due to the high impedance of resistor 352, this is a high impedance path and consequently capacitors 310 and 311 will switch relatively slowly. Once switching is completed, capacitors 310 and 311 are both polarized to the right.

It should be noted that it is not necessary for capacitor 321 to be fully switched before capacitors 310 and 311 begin switching under the influence of + on the left side of the register. This is due to the capacity of crystal 321 with respect to that of 310, 311, and, in fact, all other capacitors within the shift register proper. Capacitor 321 is chosen to have a smaller capacity than the others and consequently transfers a relatively small charge into the shift register upon switching, when considered in relation to the charge transferred upon the switching of a shift register capacitor.

The charge produced by the switching of capacitors 310 and 311 is effective upon transistors Q4 and Q5 to change the state of the multivibrator so that —— now appears on the left-hand side and + appears on the right-hand side. A wave form of this action appears in FIG. 2. The wave form depicted is actually that which would appear on the collector of transistor Q4. When capacitor 311 is polarized to the right, a path is present from + on the collector of Q5 through capacitor 311, diode 341, and capacitor 312 to —— on the collector of Q4. Switching of these capacitors occurs. The capacitors of the first stage are now in their initial condition and capacitor 312 of the second stage is polarized to the left.

The —— appearing on the collector of Q4 finds a path through diode 339, resistor 338, and resistor 337 to +. This is effective to turn on normally nonconducting transistor Q2, thereby causing the voltage at the collector thereof to go to approximately +, the voltage on its emitter. This discharges capacitor 331 in the base of transistor Q1.

Upon occurrence of the second signal element of assumed character "A," which is a mark element (and therefore, ++), transistor Q1 is driven only further into nonconduction. Consequently, the above-described sequence of events is not effective to transfer an additional space element into the shift register.

As shown in FIG. 2, the timer is designed to automatically switch back to its initial condition (+ at the collector of Q4), shortly after the second signal element is placed in the shift register. Transistor Q4, therefore, again goes into conduction and transistor Q5 is cut off. The resulting + voltage on the left of the shift register finds a path through capacitor 312 which is now polarized to the left, diode 342, avalanche diode 324, and capacitor 313 to —— on the collector of transistor Q5. These capacitors switch, leaving them both polarized to the right. It is now apparent that capacitor 311 is polarized to the left indicative of the presence of a mark pulse in the first register and that capacitor 313 is polarized to the right indicative of the space pulse in the second register. This sequence of events will continue as long as mark pulses are fed into the shift register.

When the fourth signal element of character "A" appears, a space element, switch 357 will be connected to —. At the time of application of this — space pulse, it will be noted from FIG. 2 that the left-hand side of the shift register is at —— and the right-hand side at +. This has resulted in the polarization of crystal 316 to the left. It has also caused the conduction of transistor Q2 with the attendant placement of its collector at a voltage of +. When — is applied by switch 357, the base of transistor Q1 is driven to — by charging capacitor 331 and consequently transistor Q1 conducts. Such conduction, as previously described in connection with the reception of a start pulse, causes the application of ++ through capacitors 321 and 310 in series, causing them to reverse their polarizations. Upon restoration of the timer to its initial state, the + appearing on the left side of the register will cause capacitors 310 and 311, 316 and 317 to switch in series with the — appearing on the right-hand side of the register.

The fifth and sixth signal elements operate in the same manner to read two more space pulses into the register and as the timer returns to normal following registration of the sixth pulse, the application of + to the left side of the register causes crystal 320 in the last stage, which is residing in a state polarized to the left due to the presence of the start pulse, to switch, thereby transmitting a positive pulse through diode 351 and avalanche diode 328 to various points.

The positive pulse appearing at the output of the shift register biases normally nonconducting transistor Q3 to a conducting state. As a direct results of this, — is applied via conductor 364 and resistors 413 in FIG. 4 to the base of PNP transistors Q6 through Q10. Simultaneously, the + on the left-hand side of the register causes the switching of those capacitors polarized toward the left which, in this case since an "A" character is involved, are capacitors 310, 312, and 314. As these capacitors switch, a positive voltage is applied therethrough, through the adjacent diodes and avalanche diodes to the emitters of transistors Q6 through Q8. It is thus seen that those units between Q6 and Q10 which are associated with stages having space elements stored therein are biased into conduction and provide a low impedance path for the positive pulse through to their respective flip-flop stages. Because this low imepdance path presents itself, the right-hand crystals of the shift register are not switched in this phase of the operation and consequently, upon completion of the switching of the left-hand capacitors, the entire register is in an initial state.

Upon emergence of the start pulse from the last stage of the register, transistor Q11 is rendered conducting, and in turn, renders transistor Q12 conducting. Thus, ++ is applied to all flip-flop emitters via the collector of transistor Q12. Coincidentally, the start pulse renders transistor Q15 conductive, applying ——— to all collectors of the flip-flops. The flip-flop stages will be set to render a positive potential on either the mark or space leads, depending upon the setting of their respective shift register stage.

The positive pulses appearing on the collectors of transistors Q6 through Q10 representing space elements are applied to the various flip-flops of Code Conversion Circuit 400. Only one flip-flop is shown in detail. As illustrated, these flip-flops are biased to be normally in a marking condition, i.e., the upper transistor is normally conducting and the lower transistor normally off. When a positive pulse is impressed via resistor 414 to the base of transistor Q13, that stage is cut off, and due to the intercoupling elements, transistor Q14 goes into conduction. Such a situation provides a positive voltage at the collector of transistor Q14 indicative of a space condition for the particular element the flip-flop represents.

Connected to the outputs of each flip-flop are a number of ferroelectric AND gates of the nature disclosed in the above-mentioned application Serial No. 646,998, filed March 19, 1957 by applicant. These gates comprise a single ferroelectric crystal with a conducting plate 415 covering one side, and five unit area electrodes 416 and tank electrode 417 on the opposite side thereof; the tank electrode having an area of slightly more than four units. As fully described in the cited application, when all inputs to electrodes 416 are of the same polarity, tank electrode 417 causes switching of the crystal and an output appears on lead 418. The AND gates are normally polarized by the application of — — — potential to each of the electrodes via diodes 419 in series with normally conducting transistor Q17. However, when the start pulse emerges from the last stage of the shift register, it causes normally conducting transistor Q16 to cut off, thereby cutting off transistor Q17 and opening the — — — path to the electrodes of the AND gates.

By connecting electrodes 416 to the proper flip-flop outputs, it is possible to cause the switching of the logic gates upon occurrence of predetermined characters, as evidenced by positively-charged leads. For illustrative purposes, gate 410 is shown connected to register an output pulse on lead 418 whenever an "A" character is registered. Lead 418 is merely one of a group of thirty-two possible leads 422, the energization of each of which is repersentative of a discrete character.

Before considering the operations of the circuit of FIG. 5 in response to the energization of one of leads 422, the various elements of the figure will be considered. The major portion of the illustrated circuit comprises a plurality of gas diode stages. The stages are divided into three identical groups, the inputs of each group being tied in common to leads 422, and the outputs of each group being designated "First," "Second," and "Third Character Buses," respectively. In the disclosed embodiment, each group is considered to have thirty-two stages although for brevity of illustration only three stages per group are shown. Each stage is enabled under proper conditions when the input lead of group 422 associated therewith is energized. This "enablement" is detected as a particular voltage condition on the associated output lead. Each output lead is representative of a particular character and the group in which the output leads appear is representative of the time position of the character received. Thus, assuming the three illustrated leads to be those representing characters A, B, and C, if switch 357 in FIG. 3 is operated to sequentially represent the three characters A, B, and C, leads A of the first character buses, B of the second character buses, and C of the third character buses will be enabled.

Each stage comprises the equivalent of input diode 501 and gas diode 507. The gas diode is biased by —20 volts through resistor 504 on the left side, and by —180 volts through resistors 512 and 513 in series on the right side. In addition, at predetermined times, leads 619 through 621 supply an additional bias of —200 volts to the junction of resistors 512 and 513. Gas diodes 507 are chosen to have an ionization potential slightly above 180 volts, whereas the deionization potential is slightly below 160 volts.

Figure 6:
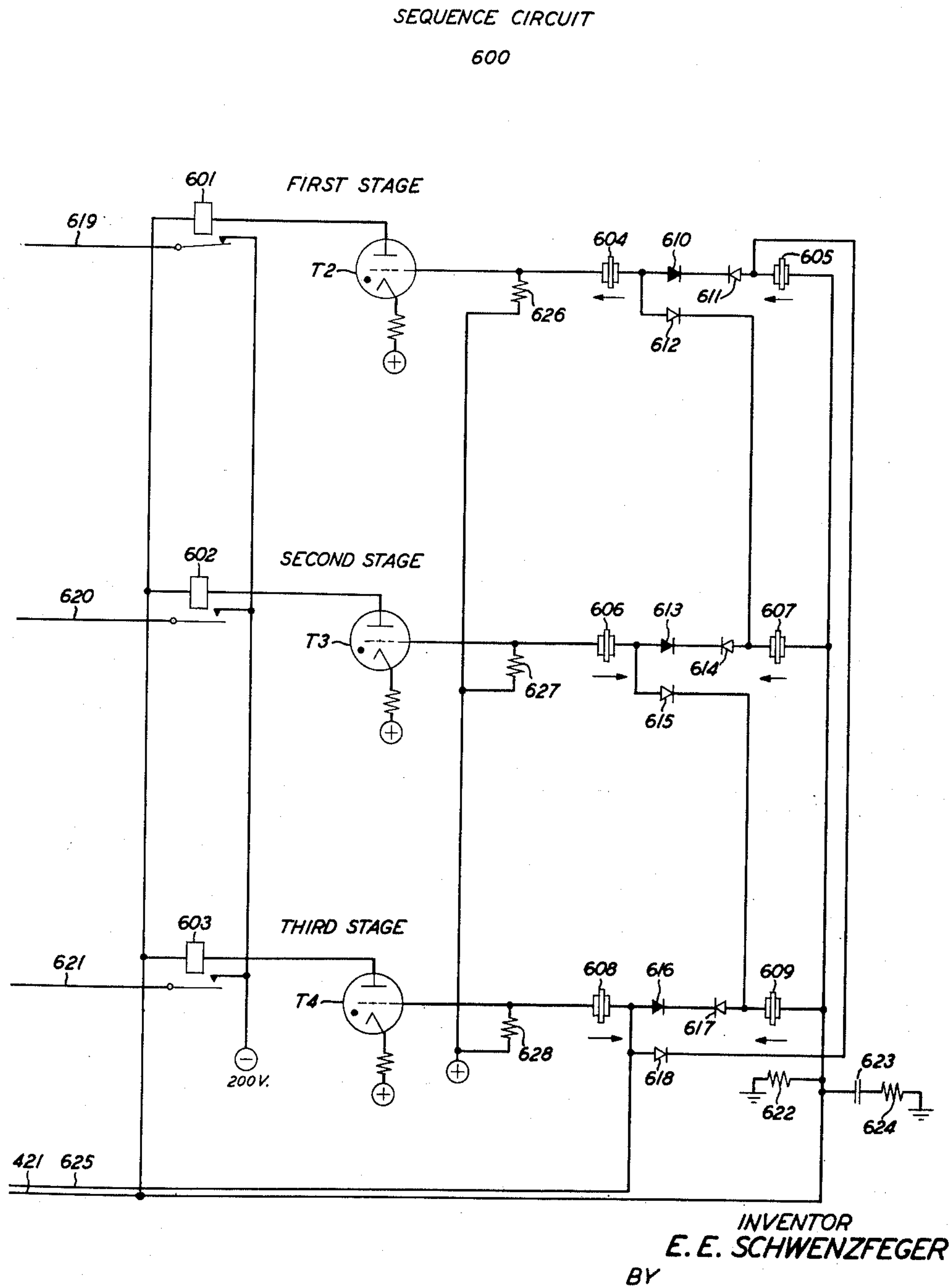
FIG. 6 is a circuit schematic of the sequence circuit used for the illustrative embodiment.

It will be noted that specific voltage values are cited in FIG. 5 and FIG. 6 in some instances. In order to most clearly describe the operation of the circuitry, it has been found that assuming such specific voltage values will enhance understanding. Variation from these values, however, would not be considered a departure from the teachings present in the invention itself.

At the lower portion of FIG. 5 a number of ferroelectric AND gates 522 through 524 have been illustrated. These AND gates are biased under the control of normally energized relay 518 which is, in turn, controlled via triode T1. The input electrodes of the ferroelectric capacitors are connected to one stage in each group of stages in accordance with the particular code combination to be decoded. For example, ferroelectric AND gate 523 is connected to provide an output when three consecutive A characters are received. Similarly, ferroelectric AND gate 524 is connected to provide an output when characters A, B, and C are consecutively received. The principle of operation of these AND gates is fully described in applicant's above-cited application. It should be noted that the AND gates are normally biased by —170 volts, via contacts 519, consequently, a potential that is positive relative to —170 will be required at their inputs in order to permit switching.

Turning to the actual circuit operation, let it be assumed that conditions are as illustrated in FIG. 6, i.e., relay 601 is operated and therefore —200 volts is being applied by lead 619 to all stages of the first character buses. At this time, the potential across gas diodes 507 in the first character buses is approximately 180 volts, an amount insufficient to cause ionization. The potential across gas diodes 508 and 509, in the second and third character buses, is approximately 160 volts, due to —20 volts on the left-hand terminal and —180 volts on the right-hand terminal.

Upon appearance of a positive pulse on lead 418, the left-hand terminal of gas diode 507 in the A stage is raised to approximately ground potential, thereby causing a voltage of approximately 200 volts across the gas diode. This results in ionization which, in turn, makes the gas diode appear as a short circuit. When the positive pulse on lead 418 subsides, the left terminal of gas diode 507 returns to approximately —20 volts. However, the potential across the ionized diode is still above 160 volts and ionization is sustained. This will be true, even though, the —200 volts on lead 619 is disconnected. Resistors 504, 512, and 513 are of such magnitude that, while gas diode 507 is in an ionized state, the potential at the right-hand terminal will be approximately —130 volts. This being true, those ferroelectric inputs connected to this stage experience a voltage of approximately 40 volts (—170 volts minus —130 volts), and therefore the connected ferroelectric AND gates are partially switched.

The gas diodes in the stages associated with the first character buses which do not receive a pulse over leads 422 do not ionize and therefore do not enable an output lead. The stages of the second and third character buses connected to lead 418 are not enabled because the combined effect of the positive pulse and the normal bias voltage is not enough to permit ionization of the gas diodes therein. In view of these factors, only one output lead is in a condition to affect the ferroelectric AND gates.

When the second character causes energization of its respective output lead in group 422, for reasons to be explained hereinafter, —200 volts is being applied to each stage of the second character buses. The Translator and Decoder during this sequence of operation will cause switching of those ferroelectric inputs associated with the second character buses. Similarly, upon occurrence of the third character, lead 621 will be the only one applying —200 volts to the Translator and Decoder and consequently only those ferroelectric inputs connected to the third character buses will receive a distinct switching impulse.

As soon as the full complement of inputs has been received by any gate, it will be switched, causing an output uniquely representative of its input. As previously mentioned, the output in this case will uniquely define three received characters and may be employed to either establish further connections or to cause connection of recording equipment in order to monitor subsequently received messages.

When Translator and Decoder Circuit 500 was being described, relay 601 was assumed to be initially energized, thereby applying —200 volts to lead 619. The reason for this initial state and the subsequent changes which permitted registration of character designations in the appropriate groups of buses will now be described.

Considering first the elements comprising FIG. 6, it will be noted that three stages are depicted. Each stage is associated with its respective character, thus the first stage controls the registration of the first characer, the second stage controls the registration of the second character, etc. A stage is composed of a relay 601, a thyratron T2, and a stage of a ferroelectric shift register (resistor 626, capacitor 604, avalanche diode 610, diode 611, and capacitor 605). The shift register shown in FIG. 6 is similar in form and operates in the same way as that previously considered in connection with the shift register in FIG. 3. The prime difference between this shift register and the one previously described is that in its initial state, one stage is in a "set" condition. The "set" condition in this instance is represented by both capacitors being polarized to the left. This is the normal effect of having the voltage on the right-hand side of the register positive with respect to the left-hand side and of a sufficient magnitude to overcome the breakdown potential of the series avalanche diode. The typical stepping operation of this shift register is now described.

Assuming that capacitors 604 and 605 are initially polarized to the left, as shown, it will be recalled that relay 420, in FIG. 4, is normally operated, thereby applying a ++ voltage via lead 421 to the right-hand side of the register. This voltage, once capacitors 604 and 605 are polarized as shown, has no effect thereon. Recall also, however, that upon reception of a character, relay 420 is momentarily de-energized. When this occurs, the right-hand side of the shift register descends toward ground potential at a rate determined by the time constant of capacitor 623 in series with resistor 624. As ground potential is reached, the + voltage on the left-hand side of the shift register is effective to switch capacitor 604 in series with capacitor 607. Also, when relay 420 releases, the ++ voltage is removed from the winding of relay 601 and the plate of thyratron T2. This causes the release of relay 601 and the deionization of of thyratron T2. Release of relay 601 removes the −200 volt potential from lead 619 which supplies the first group of character buses. When relay 420 is again energized, this again reverses the polarity across the shift register by placing ++ on the right side as opposed to the + on the left side. The effect of this potential is to switch capacitor 606 in series with capacitor 607. It is thus seen that the "set" condition has been transferred from the first stage to the second. This process continues throughout the shift register, which is of the recycling type in view of the connection provided by diode 618. As succeeding stages are "set," the switching of the left-hand capacitor causes a positive pulse to appear on the grid of its associated thyratron. This positive potential is effective to cause firing of the thyratron, and once this has taken place, an energization path is available to the relay associated therewith. Consequently, as each stage is shifted, following receipt of a character, −200 volts is supplied to the proper character buses.

When the full complement of characters has been received, the shift register has stepped the "set" condition down to the last stage. When capacitor 608 in this stage switches to the left, thyratron T4 is ionized and relay 603 causes −200 volts to be applied to the third character buses. Also, when capacitor 608 switches back to the right, a pulse, negative with respect to + cathode potential of triode T1, is applied via lead 625 to the grid of triode T1 in FIG. 5 causing it to cut off. Relay 518 is thereby de-energized causing closure of contacts 520. Consequently, −100 volts is now applied to ferroelectric capacitors 522 through 524 in place of the original −170 volts. In accordance with the principle of operation of such AND gates, and recalling that the potential of the associated inputs will be in no case above −130, all of the AND gates are reset to an initial polarization state. In addition, this resetting forces the voltage on the right-hand terminals of all gas diodes to a sufficiently low value that they will be deionized.

It may thus be seen that a combination of three characters has been received in a permutation code form and has been converted, translated and decoded to finally provide a single unique output.

It should be understood that the detailed description above is merely an illustrative embodiment of the invention claimed with particularity hereafter. Other components, voltages, and arrangements may be devised by those skilled in the art without departing from the spirit and scope of the invention.

What is claimed is:

1. In a circuit for decoding characters represented by a multielement permutation code, each of said elements being represented by an inpulse having either one of two states, register means for transposing sequentially received impulses appearing on a single line into simultaneously occurring impulses appearing on lines discretely representative of the time position of said sequentially received impulses, conversion means controlled by said register means upon receipt of a character for sensing said simultaneously occurring impulses and energizing one of two output leads per element in accordance with the state of each of said impulses, and gating means operative to produce an output upon application thereto of a fixed number of impulses, the inputs of said gating means being connected to the output leads of said conversion means to furnish a discrete output indication for each character decoded.

2. A circuit as defined in claim 1 wherein said register means comprises a multistage shift register initially having a pair of oppositely polarized ferroelectric capacitors in each stage, means for altering the polarization of one of said capacitors in a first stage when an impulse in one state is received, and a monostable multivibrator triggered by the switching of said stages for controlling the stepping of said altered polarized condition from stage to stage until all elements of a character have been received.

3. A circuit as defined in claim 1 wherein said conversion means comprises an individual flip-flop for each element of said characters, means serially connected between each said time position line and one of said flip-flops, and means for enabling said serially connected means coincident to the occurrence of said simultaneously occurring impulses, said means also enabling said flip-flops.

4. A selection circuit having a shift register comprising a plurality of serially disposed stages, each of said stages comprising a two-state element, said register responsive successively to the reception of a plurality of code signal permutations in a multielement code, a plurality of flip-flop circuits, each of said flip-flop circuits selectively actuable under control of said shift register to conditions corresponding to the condition of elements of each of said received code permutations, first gating means connected to the outputs of said flip-flop circuits in accordance with said code permutations and operative to produce a distinct output for each said code permutation, means for recycling said shift register and said first gating means to receive successive code permutations, a sequence circuit for distinguishing between permutations received, storage means controlled by said sequence circuit for selectively registering the outputs of said first gating means, and second gating means controlled by said storage means and operative to produce an output upon receipt of a particular plurality of code permutations in a predetermined sequence.

5. In a telegraph system wherein stations are identified by a plurality of characters composed of permutations of a fixed number of two-state elements, a shift register, means for sequentially applying pulses representative of said elements to said shift register, a pair of leads for each said element the selective energization of which indicates the state of their respective element, read-out means enabled upon registration of a full character in said shift register to condition said leads, AND logic gates connected to said leads according to a pattern described by the element configuration of particular characters operative to produce an output upon energization of all connected leads, storage means for storing the effect of said output, sequence means controlled by said shift register upon registration of a full character to enable said storage means to discretely register a subsequent character, further AND logic gates connected to said storage means operable to produce an output identifying particular stations upon storage of the characters representative thereof, and means controlled by said sequence means upon receipt of said plurality of character to reset said storage means and said further AND logic gates to an initial condition.

6. In a telegraph system wherein stations are identified by a plurality of characters in a multielement sequentially received mark-space code, register means for transposing said sequentially received mark-space code upon receipt of each character into simultaneously occurring potential conditions appearing on conductors representative of the time position of the elements of said mark-space code, a flip-flop for each element of said mark-space code, the states of said flip-flops being representative of either a mark or space condition, said flip-flops normally residing in a mark state, gating means operative upon receipt of each character and controlled by said register means to shift those flip-flops representative of space elements, first logic circuitry having an input for each element of a character and a single output conditioned upon energization of all inputs, means connecting said inputs to said flip-flops in accordance with the element states of particular characters, thereby insuring an output upon reception of said characters, character counting means controlled by said register means to register the completed reception of each character, storage means controlled by said character counting means for storing the output indications of said first logic circuitry, second logic circuitry having an input for each character of a station identification and a single output conditioned upon energization of all inputs, and means connecting said second logic circuitry inputs to said storage means in accordance with the characters of particular station identifications thereby insuring an output upon storage of a full complement of station identification characters.

7. A telegraph system as defined in claim 6 wherein said register means comprises a multistage shift register initially having a pair of oppositely polarized ferroelectric capacitors in each stage, means for altering the polarization of one of said capacitors in the first stage only upon occurrence of space elements, and stepping means normally residing in a first condition and briefly switched to a second condition by the switching of said stages for controlling the stepping of said altered polarization condition from stage to stage until all elements of a character are received.

References Cited in the file of this patent

UNITED STATES PATENTS

| | | |
|---|---|---|
| 2,805,283 | Stiles | Sept. 3, 1957 |
| 2,876,435 | Anderson | Mar. 3, 1959 |
| 2,878,313 | Tolson | Mar. 17, 1959 |